United States Patent
Care et al.

(10) Patent No.: US 9,803,648 B2
(45) Date of Patent: Oct. 31, 2017

(54) RETAINER PLATE

(71) Applicant: ROLLS-ROYCE PLC, London (GB)

(72) Inventors: Ian Colin Deuchar Care, Derby (GB); Matthew Paul Jevons, Derby (GB)

(73) Assignee: ROLLS-ROYCE PLC, London (GB)

( * ) Notice: Subject to any disclaimer, the term of this patent is extended or adjusted under 35 U.S.C. 154(b) by 507 days.

(21) Appl. No.: 14/481,107

(22) Filed: Sep. 9, 2014

(65) Prior Publication Data
US 2015/0093248 A1    Apr. 2, 2015

(30) Foreign Application Priority Data
Sep. 27, 2013 (GB) .................... 1317161.6

(51) Int. Cl.
| | | |
|---|---|---|
| F04D 29/34 | (2006.01) | |
| F01D 5/30 | (2006.01) | |
| F01D 5/32 | (2006.01) | |
| F04D 19/00 | (2006.01) | |

(52) U.S. Cl.
CPC ........... *F04D 29/34* (2013.01); *F01D 5/3015* (2013.01); *F01D 5/323* (2013.01); *F04D 19/002* (2013.01); *F01D 5/3092* (2013.01); *F05D 2250/283* (2013.01); *F05D 2260/80* (2013.01); *F05D 2300/603* (2013.01); *F05D 2300/612* (2013.01); *Y02T 50/672* (2013.01)

(58) Field of Classification Search
CPC ...... F01D 5/3015; F01D 5/3092; F01D 5/323; F04D 19/002; F04D 29/34; F05D 2250/283; F05D 2260/80; F05D 2300/603; F05D 2300/612
See application file for complete search history.

(56) References Cited

U.S. PATENT DOCUMENTS

| | | |
|---|---|---|
| 5,259,728 A | 11/1993 | Szpunar et al. |
| 5,282,720 A | 2/1994 | Szpunar |
| 6,488,473 B1 | 12/2002 | Lee et al. |
| 2009/0226321 A1 | 9/2009 | Buisson et al. |
| 2011/0110781 A1 | 5/2011 | Dao et al. |
| 2013/0202449 A1* | 8/2013 | Lombard ................. F01D 5/02 416/244 R |

FOREIGN PATENT DOCUMENTS

| | | |
|---|---|---|
| DE | 19960896 A1 | 6/2001 |
| WO | WO 2010/128229 A1 | 11/2010 |

OTHER PUBLICATIONS

Jan. 30, 2015 Search Report issued in European Application No. 14183882.
Search Report issued in British Application No. GB1317161.6 issued Mar. 27, 2014.

* cited by examiner

*Primary Examiner* — Christopher Besler
(74) *Attorney, Agent, or Firm* — Oliff PLC

(57) ABSTRACT

A retainer plate is provided for retaining a dovetail root of a fan blade of a gas turbine engine in a corresponding axially-extending slot in the rim of a fan disc. In use, the plate locates in a cavity formed at an end of the slot such that a first side of the plate is arranged for contact with an axial end face of the dovetail root and an opposite second side of the plate is arranged for contact with an abutment surface of the cavity to limit axial movement of the root along the slot. The retainer plate is a unitary component and has a layered structure including a first layer at the first side of the plate, a second layer at the second side of the plate, and an intermediate layer between the first and the second layers.

14 Claims, 7 Drawing Sheets

RETAINER PLATE

FIELD OF THE INVENTION

The present invention relates to a retainer plate for retaining a dovetail root of a fan blade of a gas turbine engine in a corresponding axially-extending slot in the rim of a fan disc.

BACKGROUND OF THE INVENTION

Many aero-engines adopt a dovetail style of fan blade root which locates in a corresponding slot formed in the rim of the fan disc. During service operation, the fan assembly is subject to a complex loading system, consisting of centripetal load, gas-bending and vibration. The dovetail geometry copes particularly well with this kind of loading conditions. Retention devices are fitted to restrain axial movement of fan blades resisting thrust loading under normal running and axial loading during fan blade impact events.

Engine casings must be capable of containing the release of a single compressor or turbine blade, or any likely combinations of blades. In particular, an engine must pass a fan blade-off test to demonstrate mechanical integrity of all systems following the loss of a fan blade. The test is a single-shot exercise, comprising the deliberate release of the portion of a blade outboard of its retention feature at the maximum low pressure shaft speed, either on a full engine or a-fan-blade-off rig.

When the blade is released, it is retained by the casing and is then hit by the following blade, which tends to push the released blade backward (toward the rear of the engine). In reaction, it produces a force pushing the following blade (still retained by the fan disc) forward. The resulting load can be as much as about 80,000 lbf (356 kN) in the axial direction.

Bird impacts on fan blades can also cause axial high loads.

The retention device restraining axial movement of a fan blade must be able to withstand these types of axial load. However, it should also be as light as possible to reduce the weight of the engine.

Shear keys (see e.g. U.S. Pat. No. 5,624,233) and thrust rings (see e.g. GB A 2262139) can be used as retention devices. Another type of retention device takes the form of individual retainer or shear plates positioned at the ends of the fan disc slots.

SUMMARY OF THE INVENTION

An aim of the present invention is to provide an improved retention device to restrain axial movement of fan blades.

Accordingly, in a first aspect, the present invention provides a retainer plate for retaining a dovetail root of a fan blade of a gas turbine engine in a corresponding axially-extending slot in the rim of a fan disc, in use, the plate locating in a cavity formed at an end of the slot such that a first side of the plate is arranged for contact with an axial end face of the dovetail root and an opposite second side of the plate is arranged for contact with an abutment surface of the cavity to limit axial movement of the root along the slot;
 wherein the retainer plate is a unitary component and has a layered structure including a first layer at the first side of the plate, a second layer at the second side of the plate, and an intermediate layer between the first and the second layers, the first, intermediate and second layers being formed of different materials, and the Young's moduli of the first and intermediate layers in the axial direction being less than that of the second layer.

The layers of the plate provide a functionally graded plate structure. By varying the Young's moduli of the layers in this manner, the first and intermediate layers can spread the contact load with the axial end face of the dovetail root. Further, by forming the retainer plate as a unitary component, installation of the plate is simplified and problems of sub-component misalignment can be avoided.

The retainer plate of the first aspect may have any one or, to the extent that they are compatible, any combination of the following optional features.

The layers of the retainer plate may be bonded together by suitable adhesives, or by welding or brazing in the case of metal-on-metal bonds.

Galvanic corrosion can be a problem particularly when different materials are used for the retainer plate and the dovetail root, such as for a metal retainer plate and fan blades formed of carbon fibre composite material. The first layer may thus form a barrier to galvanic corrosion between the dovetail root and subsequent layers of the retainer plate. The first layer may be formed of a polymer matrix composite, such as a glass fibre reinforced composite. The reinforcing fibres of such a composite can extend predominantly in the plane of the layer to reduce the Young's modulus in the axial direction (transversely to the fibre direction). The first layer may have a Young's modulus in the axial direction of less than 10 GPa.

The intermediate layer may be an elastomer or have elastomeric properties. The intermediate layer may have a Young's modulus in the axial direction of less than 1 GPa, and preferably less than 0.1 GPa. The intermediate layer can thus be the primary load spreading layer of the plate. Although the first layer may have a higher Young's modulus than the intermediate layer, by reducing the relative thickness of the first layer the load spreading capacity of the intermediate layer may be maintained. For example, the thickness of the first layer may be no more than half, and preferably no more than a quarter, the thickness of the intermediate layer.

The second layer may be a metal, e.g. a high strength metal such as a nickel alloy. The second layer may have a Young's modulus in the axial direction of more than 100 GPa, and preferably more than 200 GPa.

The second layer may be curved to give the second side a concave outer face. Particularly when the abutment surface of the respective cavity is formed as a pair of abutment surface portions which extend along respective circumferentially-spaced edges of the plate, this can allow the second layer to act as a spring when pressing on the abutment surface, giving the second layer different levels of resilience as it is progressively loaded by movement of the dovetail root.

The layered structure may further include a crush layer which is permanently crushable in the axial direction at a lower compressive stress than that of the second layer. For example, the ultimate compressive strength of the crush layer in the axial direction may be less than about 150 MPa. Such a crush layer can provide a useful indication of possible damage to the fan blade. In particular, a bird impact may cause externally invisible damage to a composite material fan blade. However, because the impact causes axial movement of the blade root which is restrained by the retainer plate, the occurrence of the bird impact can be revealed by the permanent deformation of the crush layer. Appropriate maintenance in relation to the impacted blade can then be performed. The crush layer may be between the intermediate and the second layers. The crush layer may be a structural foam or a honeycomb. The crush layer may contain a colorant indicator which is released by the crush layer when it is crushed, or indeed at lower compressive stresses in the axial direction than the ultimate compressive strength of the crush layer.

The first layer may have a low friction coating on its outer face. This can help to reduce fretting damage to the dovetail root. For example, the coating may be a PTFE coating.

The layered structure can further include an additional layer between the intermediate and the second layers, the Young's moduli of the first and intermediate layers in the axial direction also being less than that of the additional layer. For example, the additional layer may be a metal, e.g. a high strength metal such as a nickel alloy. The additional layer may have a Young's modulus in the axial direction of more than 100 GPa, and preferably more than 200 GPa. The additional and the second layers may be formed of the same material. The additional layer may be spaced from the second layer, for example by the crush layer if present. The additional layer thus provides a mechanism to share load between it and the second layer. Where an additional layer is deployed, it may be arranged to elastically deform before the second layer. In particular, it may be sprung, e.g. by having a curved shape.

Conveniently, the retainer plate may have a circumferentially extending groove for location therein of a support ring which, in use, supports a circumferential row of the plates on the disc.

The retainer plate may be substantially trapezoidal in shape. In use, the parallel edges of the trapezoid can form radially-spaced inner and outer edges of the plate (the shorter parallel edge generally being the radially outer edge), and the angled edges can form circumferentially-spaced edges of the plate.

In a second aspect, the present invention provides a fan assembly of a gas turbine engine, the assembly having:
a fan disc;
a circumferential row of fan blades, each fan blade having a dovetail root which is retained in a corresponding axially-extending slot in the rim of the fan disc; and
a circumferential row of first retainer plates according to the first aspect;
wherein each first retainer plate is located in a cavity formed at an end of a respective one of the slots such that the first side of the first retainer plate is arranged for contact with an axial end face of the respective dovetail root and the opposite second side of the first retainer plate is arranged for contact with an abutment surface of the cavity to limit axial movement of the root along the slot.

The fan assembly may further have:
a circumferential row of second retainer plates according to the first aspect;
wherein each second retainer plate is located in a cavity formed at an opposite end of a respective one of the slots such that the first side of the second retainer plate is arranged for contact with an axial end face of the respective dovetail root and the opposite second side of the second retainer plate is arranged for contact with an abutment surface of the cavity to limit axial movement of the root along the slot.

The first and second retainer plates may have any one or, to the extent that they are compatible, any combination of the optional features of the first aspect discussed above. Further, the fan assembly of the second aspect may have any one or, to the extent that they are compatible, any combination of the following optional features.

The abutment surface of each cavity may be formed as a pair of abutment surface portions which extend along respective circumferentially-spaced edges of the respective retainer plate.

The or each circumferential row of retainer plates may be supported by a respective support ring which locates in circumferentially extending grooves of the plates of the row.

Each fan blade may be radially outwardly chocked in its slot by a respective slider inserted into the slot radially inwardly of the dovetail root. The slider may carry a spring element which urges the fan blade radially outwardly.

At least the dovetail roots of the fan blades may be formed of polymer matrix, fibre reinforced, composite material, such as carbon fibre reinforced composite material. The retainer plates offer advantages over shear key approaches for restraining axial movement of composite material fan blades. In particular, shear keys generally require slots to be formed in the dovetail root, which on a composite blade may sever fibres in the root. The retainer plates, in contrast, act on the axial end faces.

In a third aspect, the present invention provides a gas turbine engine having the fan assembly of the second aspect.

The fan assembly may have any one or, to the extent that they are compatible, any combination of the optional features of the second aspect discussed above.

BRIEF DESCRIPTION OF THE DRAWINGS

Embodiments of the invention will now be described by way of example with reference to the accompanying drawings in which.

DETAILED DESCRIPTION AND FURTHER OPTIONAL FEATURES OF THE INVENTION

Figure 1:
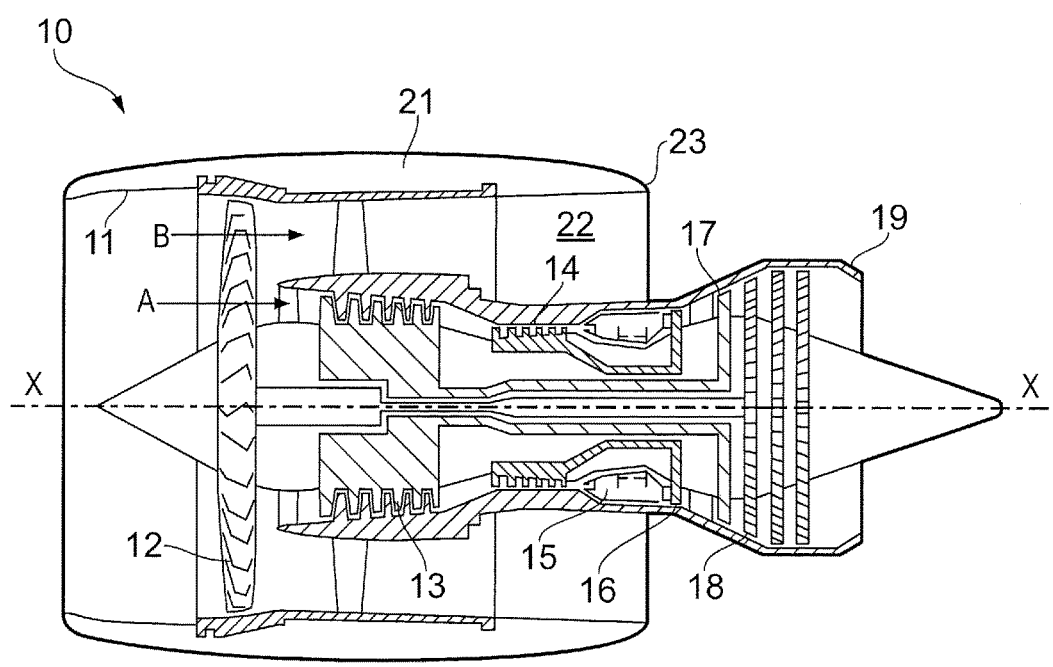
FIG. 1 shows a schematic longitudinal cross-section through a ducted fan gas turbine engine.

With reference to FIG. 1, a ducted fan gas turbine engine incorporating the invention is generally indicated at 10 and has a principal and rotational axis X-X. The engine comprises, in axial flow series, an air intake 11, a propulsive fan 12, an intermediate pressure compressor 13, a high-pressure compressor 14, combustion equipment 15, a high-pressure turbine 16, an intermediate pressure turbine 17, a low-pressure turbine 18 and a core engine exhaust nozzle 19. A nacelle 21 generally surrounds the engine 10 and defines the intake 11, a bypass duct 22 and a bypass exhaust nozzle 23.

During operation, air entering the intake 11 is accelerated by the fan 12 to produce two air flows: a first air flow A into the intermediate pressure compressor 13 and a second air flow B which passes through the bypass duct 22 to provide propulsive thrust. The intermediate pressure compressor 13 compresses the air flow A directed into it before delivering that air to the high pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines respectively drive the high and intermediate pressure compressors 14, 13 and the fan 12 by suitable interconnecting shafts.

The propulsive fan 12 includes a circumferential row of fan blades secured to a fan disc. The fan blades can be formed of polymer matrix, fibre reinforced, composite material, such as carbon fibre reinforced composite material.

Figure 2:
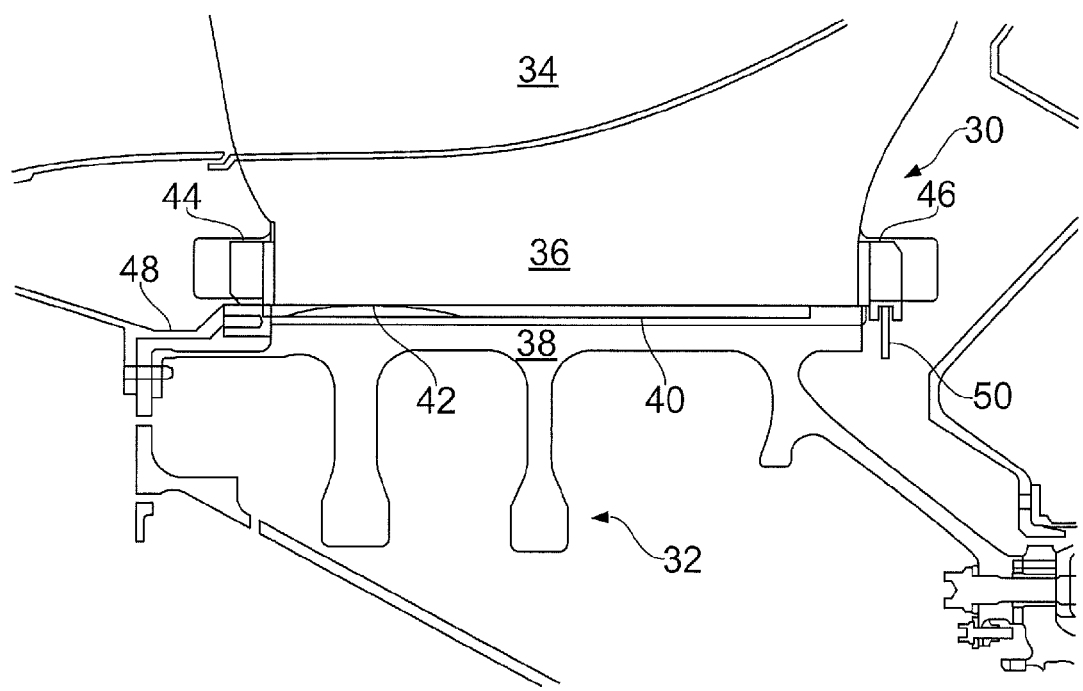
FIG. 2 shows a schematic longitudinal cross-section of the mounting region of a fan blade to a fan disc.

FIG. 2 shows a schematic longitudinal cross-section of the mounting region of one of the fan blades 30 to the fan disc 32. The blade has an aerofoil section 34 and a dovetail root 36 which is retained in a corresponding axially-extending slot in the rim 38 of the disc.

A slider 40 and spring 42 assembly is inserted into the slot at the underside of the dovetail root 36 to chock the blade 30 radially outwardly. The slider helps to prevent the spring fretting against the disc 32. It also helps to prevent the ingress of dirt into cavity beneath the dovetail root.

A substantially trapezoidal front retainer plate 44 is located in a cavity formed at the front end of the slot to limit forward axial movement of the dovetail root 36 along the slot, and a rear substantially trapezoidal retainer plate 46 is located in a cavity formed at the rear end of the slot to limit rearward axial movement of the dovetail root along the slot. The plates are held in place by front 48 and rear 50 support rings.

Figure 3:
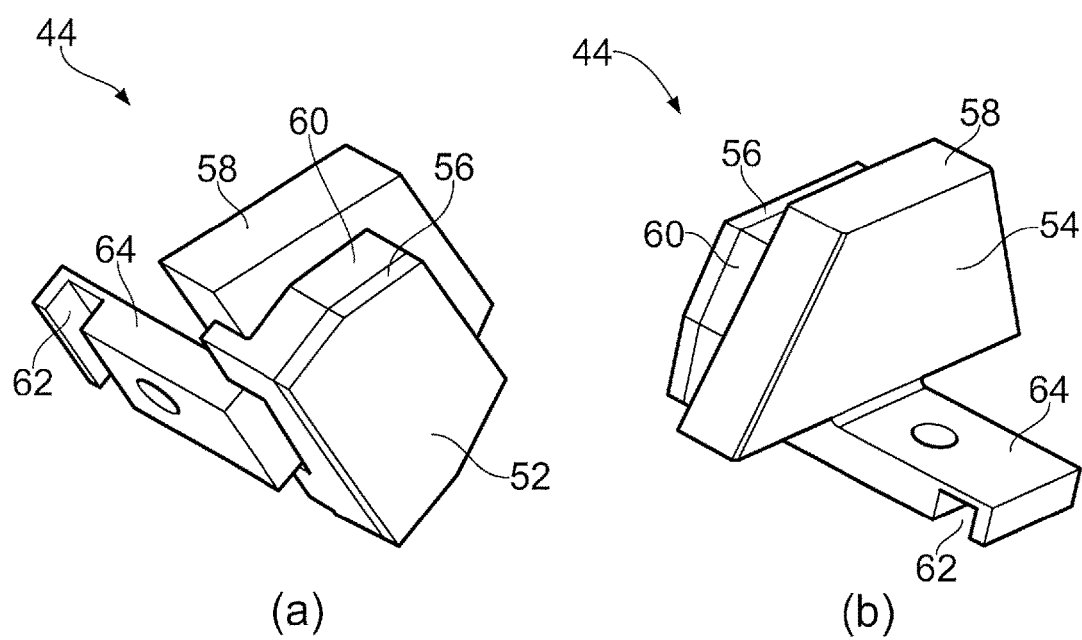
FIG. 3 shows schematic perspective views of a retainer plate for retaining a dovetail root of the fan blade in a corresponding axially-extending slot in the rim of the fan disc, the views being at (a) from a first side of the plate arranged for contact with an axial end face of the dovetail root, and (b) from an opposite second side of the plate.

Considering in more detail the retainer plates, FIG. 3 shows schematic perspective views of the front retainer plate 44, the views being at (a) from a first side 52 of the plate arranged for contact with the axial end face of the dovetail root 36, and (b) from an opposite second side 54 of the plate. The plate is a unitary component having a multi-layer (functionally graded) structure. A first layer 56 is at the first side of the plate, a second layer 58 is at the second side of the plate, and an intermediate layer 60 is sandwiched between the first and the second layers. The layers are bonded together by suitable adhesive.

The first layer 56 is formed from glass fibre reinforced composite and acts as a galvanic corrosion barrier between the dovetail root 36 and the surrounding metal. The reinforcing fibres of the composite extend predominantly in the plane of the layer to reduce the Young's modulus in the axial direction (transversely to the fibre direction) to typically less than about 10 GPa. A thin PTFE coating may be adhered to the outer surface of the first layer to reduce fretting damage to the dovetail root.

The intermediate layer 60 is formed from elastomer to spread the contact load of the axial end face of the dovetail root 36 at the first side 52 of the plate. Typically, the elastomer has a Young's modulus in the axial direction of less than 1 GPa. Although, the first layer 56 may have a slightly higher Young's modulus in this direction, it is still sufficiently compliant (due to its nonetheless low Young's modulus and relative thinness compared to the intermediate layer) to allow the intermediate layer to perform its load spreading role.

The second layer 58 is formed from a high strength nickel alloy, giving it a Young's modulus in the axial direction of more than 200 GPa. As described in more detail below, the second layer makes contact with an abutment surface provided by the rim 38 of the disc 32 to limit axial movement of the dovetail root 36 along the slot.

The second layer 58 is formed as a trapezium. The edges of the first 56 and intermediate 60 layers are set back from the two angled edges and the short parallel edge of the second layer, but extend beyond the long parallel edge of the second layer.

The plate 44 also has a circumferentially extending groove 62 at the underside of an arm 64 extending from the second layer 58. As described in more detail below, the groove is for location therein of a support ring.

The rear retainer plate 46 is similar to the front plate 44, except that the groove of the rear plate is formed directly in its metal second layer, rather than in an arm extending from the layer.

Figure 4:
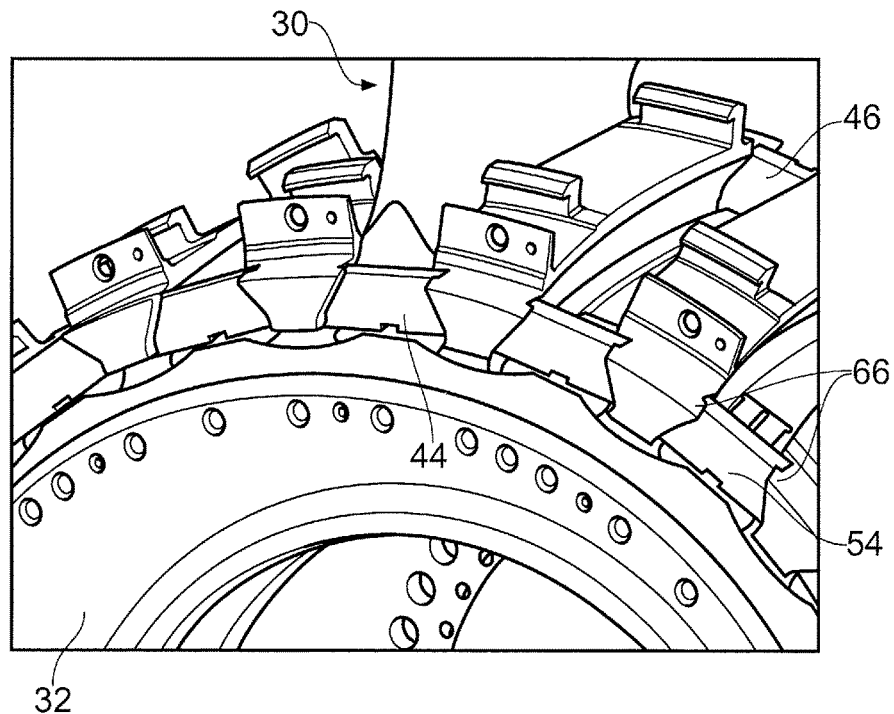
FIG. 4 shows a schematic perspective view of the front of the fan disc, and in particular a circumferential row of front retainer plates.
Figure 5:
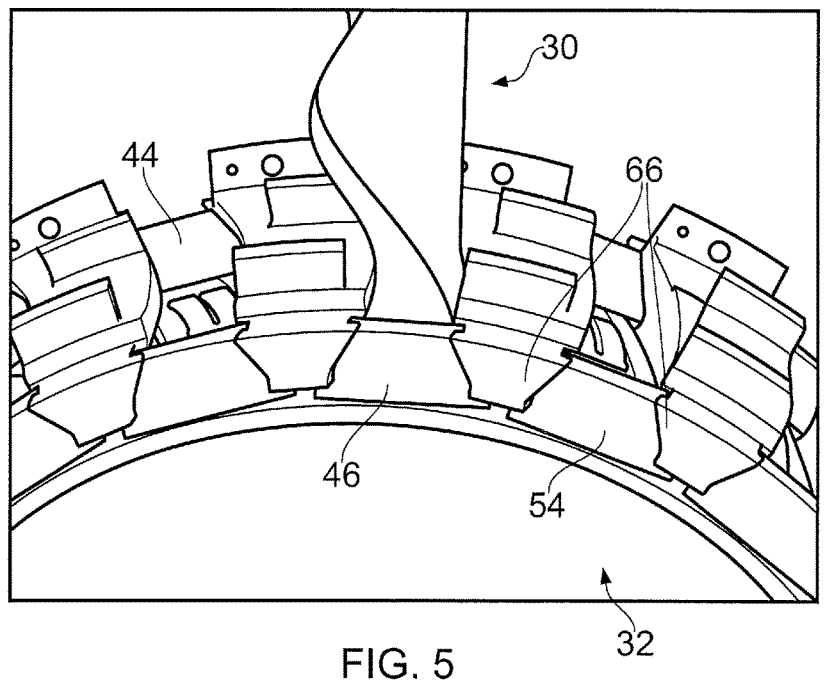
FIG. 5 shows a schematic perspective view of the rear of the fan disc, and in particular a circumferential row of rear retainer plates.

FIG. 4 shows a schematic perspective view of the front of the disc 32, and FIG. 5 shows a schematic perspective view of the rear of the disc. At each end of each dovetail root slot, the disc rim 38 has a cavity in which the respective retainer plate 44, 46 is located. In particular, the cavity creates a trapezoidal space in which the second layer 58 is positioned with the short parallel edge of the trapezoidal form being radially outwardly of the long parallel edge, and the angled edges of the trapezoidal form being circumferentially spaced from each other. The plate is slotted into the cavity with a radially outwardly directed motion. The first 56 and intermediate 60 layers of the plate project from the space for the second layer 58 into the slot for the dovetail root 36 to contact the end face of the root. Each cavity has a pair of angled projections 66 which provide the abutment surface for the second side 54 of the plate, the abutment surface being in the form of a pair of abutment surface portions which extend along the angled edges of the second layer.

Figure 6:
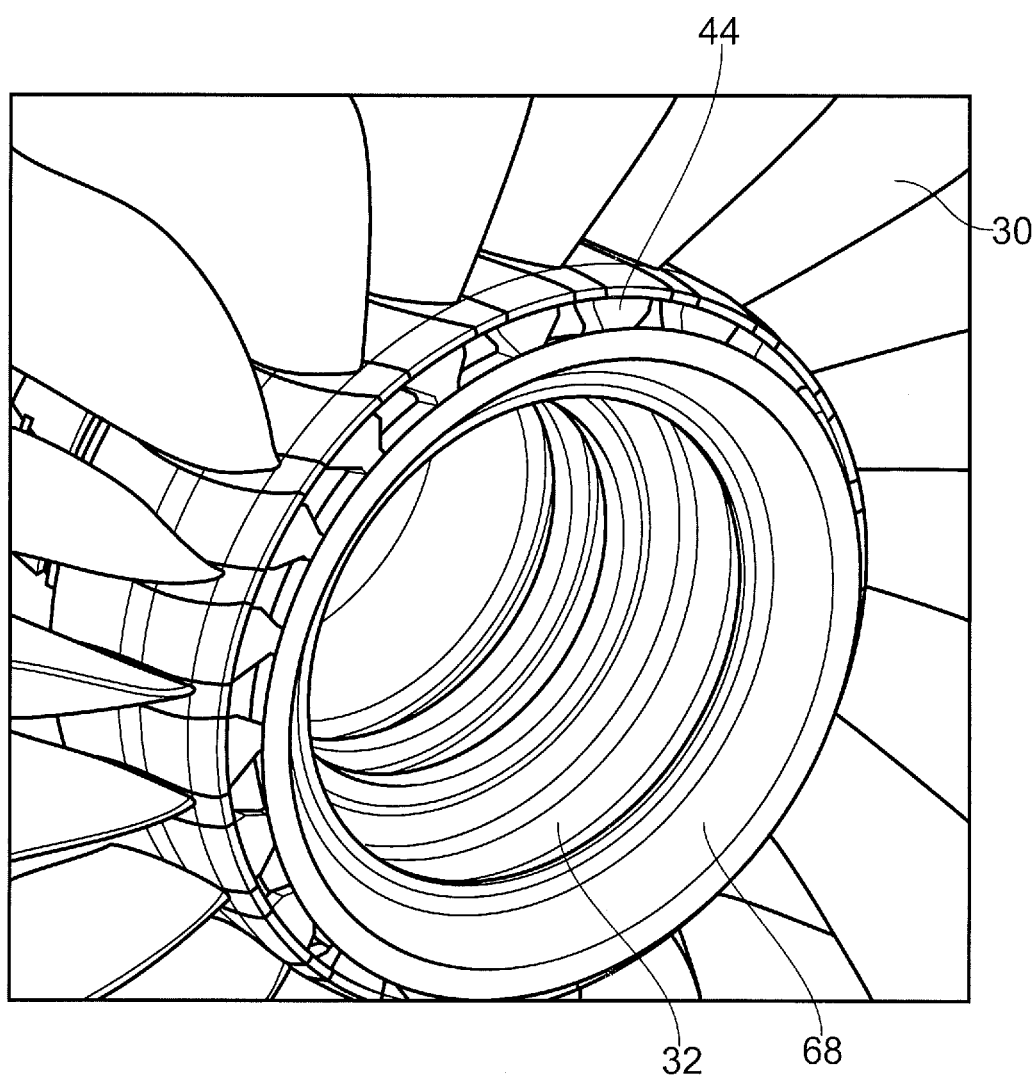
FIG. 6 shows a schematic perspective view of the front of the fan disc, and in particular a support ring for the circumferential row of front retainer plates.
Figure 7:
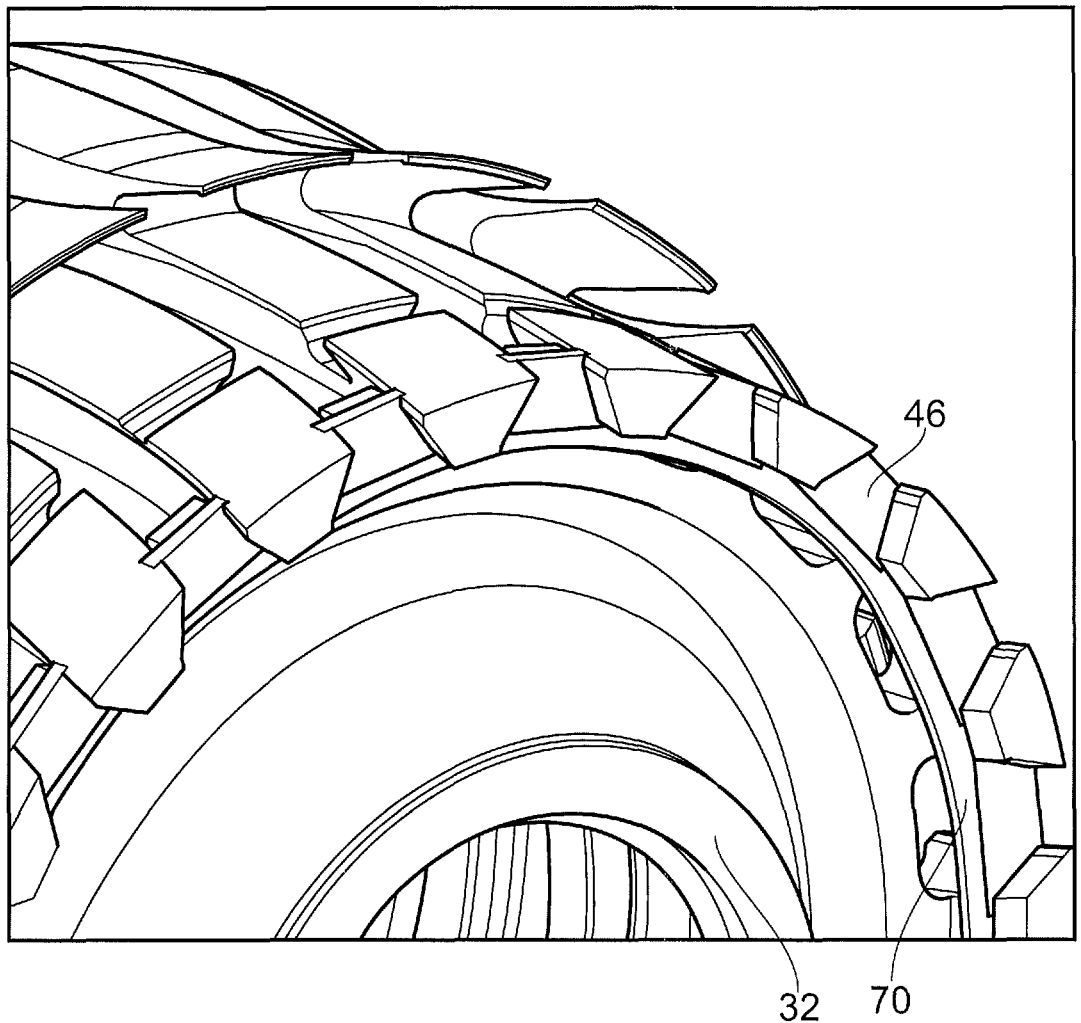
FIG. 7 shows a schematic perspective view of the rear of the fan disc, and in particular a support ring for the circumferential row of rear retainer plates.

The trapezoidal form of the retainer plates 44, 46, with the short parallel edge being located radially outwardly, keeps the plates in their cavities under centrifugal loading. However, as shown in FIGS. 6 and 7, when the engine is stationary, the plates are kept in place by front 68 and rear 70 support rings located in the circumferentially extending grooves 62 of the plates.

Figure 8:
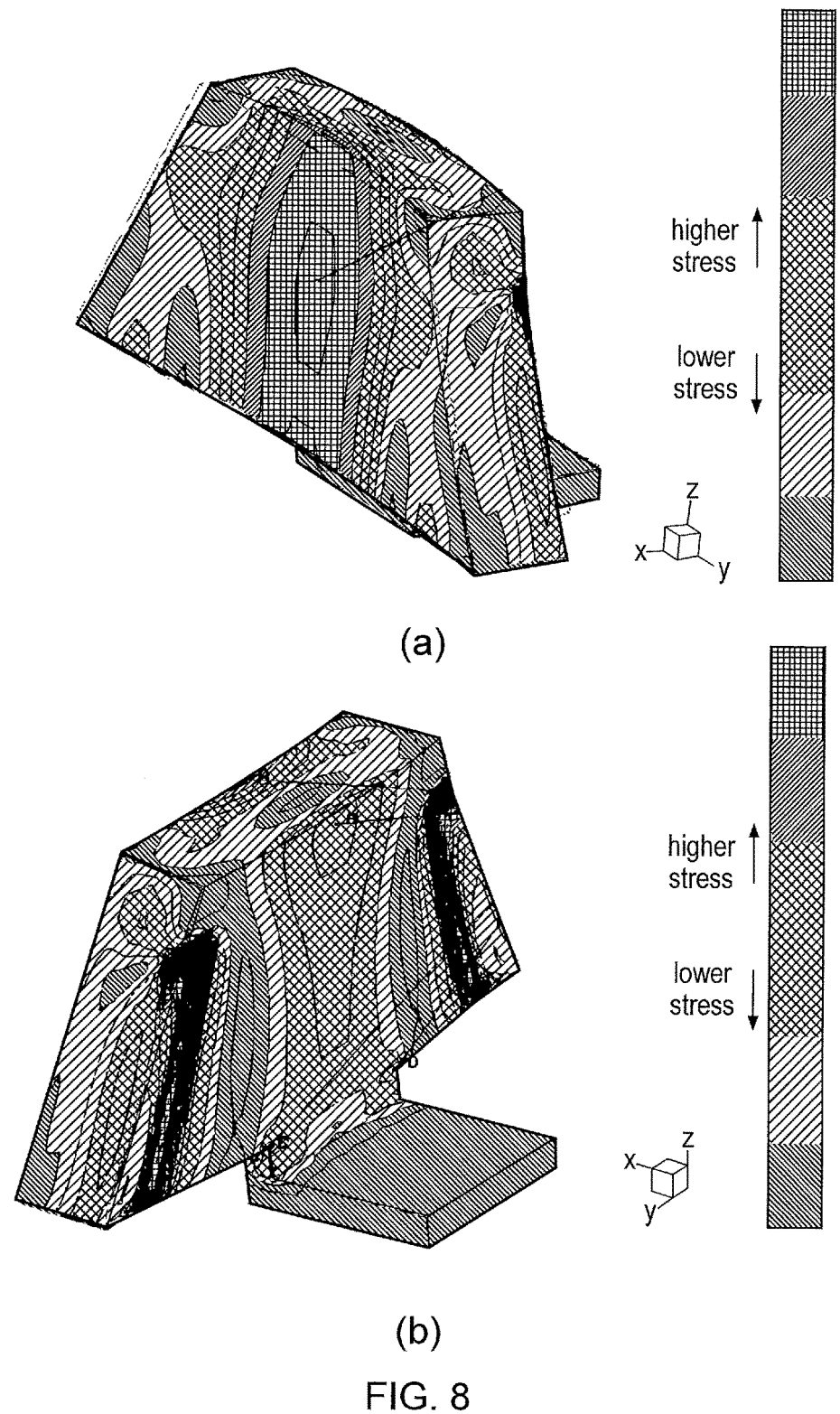
FIG. 8 shows relative values of modelled von Mises stress on (a) the first side and (b) the second side of a front retainer plate during a large bird strike event.

FIG. 8 shows relative values of modelled von Mises stress on (a) the first side and (b) the second side of a front retainer plate during a large bird strike event. The deformation of the plate is also illustrated with reference to an outline of the undeformed plate. The plate is formed as a single metal piece, i.e. without the low Young's modulus first and intermediate layers discussed above. The loading at the centre of the first side of the plate due to direct contact with the axial end face of the dovetail root is evident from the region of high von Mises stress in FIG. 8(a). Similarly, the high stresses at the edges of the second side of the plate due to the plate's contact with the angled projections providing the abutment surface are evident from the high von Mises stress regions in FIG. 8(b). By providing first and intermediate layers which have low Young's moduli in the axial direction at the first side of the plate, it is possible to ensure that the contact load illustrated in FIG. 8(a) is evenly spread, and therefore that damage to the composite dovetail root of the blade can be avoided. More generally, the first and intermediate layers can also help to damp vibrations in and reduce frettage of the root.

The retainer plates 44, 46 shown in FIGS. 2 to 7 can be modified in various ways to improve or enhance their performance.

One option is to curve the second layer 58 so that the second side 54 of the plate 44, 46 has a concave outer face, i.e. so that centre of the second side is closer to the end face of the dovetail root than the regions of the second side in contact with the angled projections 66. This allows the second layer to flex in the manner of a spring, giving the second layer different levels of resilience as it is progressively loaded by movement of the root.

Another option is to include a crush layer, e.g. formed of structural (preferably metal) foam or honeycomb material, and preferably containing a colorant indicator, in the plate 44, 46. For example, such a layer can be included between the intermediate 60 and second 58 layers. When the blade 30 is impacted, such as by a large bird strike, the permanent deformation of the crush layer and the release of the colorant indicator show that a high force event on the blade has occurred, which may not be evident from any external damage to the blade.

Yet another option is to include an additional high strength (e.g. nickel alloy) layer between the intermediate 60 and the second 58 layers. The additional layer may be spaced from the second layer, for example by the crush layer if present. The additional layer can share load with the second layer.

Thus, in a preferred arrangement for large unidirectional layered, carbon fibre composite, fan blades, the root of the blade is finished with a compliant outer layer, such as a woven glass fibre mat with epoxy matrix. This outer layer acts both as galvanic isolator and load spreader for the blade root. The retainer plate has a PTFE layer on top of a fabric base such as aramid or glass in contact with blade root. The fabric base in turn is affixed to an elastomeric layer, such as a Viton™ or equivalent (providing resistance to contaminants and fluids found on gas turbines and aircraft in their operating environment, as well as load spreading). This elastomeric layer is attached to a curved (sprung) high strength layer with a modulus in the axial direction of around 100 GPa to 180 GPa, the curved layer being backed by a structural metallic foam within which is a polymeric foam and colorant (micro)beads. The curved layer is attached radially inwardly of the structural foam and/or through the structural foam to a further high strength layer with a higher modulus in the axial direction of around 150 GPa to 220 GPa. This further high strength layer may also be curved (sprung). The further high strength layer then engages the abutment surface of the disc. If it is of a different material to the disc, then at least where it contacts the disc it may be coated an anti-fret and galvanic isolation layer(s).

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the scope of the invention.

All references referred to above are hereby incorporated by reference.

The invention claimed is:

1. A fan assembly of a gas turbine engine, the assembly having:
   a fan disc;
   a circumferential row of fan blades, each fan blade having a dovetail root which is retained in a corresponding axially-extending slot in a rim of the fan disc; each slot having a cavity formed at an end of the slot; and
   a circumferential row of first retainer plates, each first retainer plate having a layered structure including a first layer at a first side of the first retainer plate, a second layer at a second side of the first retainer plate, and an intermediate layer between the first and the second layers, the first, intermediate and second layers being formed of different materials each having a different Young's Modulus, and the Young's moduli of the first and intermediate layers being less than the Young's Modulus of the second layer;
   wherein each first retainer plate is located in a respective one of the cavities such that the first side of the first retainer plate is arranged for contact with an axial end face of the respective dovetail root and the opposite second side of the first retainer plate is arranged for contact with an abutment surface of the cavity to limit axial movement of the root along the slot.

2. A fan assembly according to claim 1 which further has:
   a further cavity formed at an axially opposite end of each axially-extending slot;
   a circumferential row of second retainer plates,
   each second retainer plate having a layered structure including a first layer at the first side of the second retainer plate, a second layer at the second side of the second retainer plate, and an intermediate layer between the first and the second layers, the first, intermediate and second layers being formed of different materials each having a different Young's Modulus, and the Young's moduli of the first and intermediate layers being less than the Young's Modulus of the second layer;
   wherein each second retainer plate is located in a respective one of the further cavities such that the first side of the second retainer plate is arranged for contact with an axial end face of the respective dovetail root and the opposite second side of the second retainer plate is arranged for contact with an abutment surface of the further cavity to limit axial movement of the root along the slot.

3. A fan assembly according to claim 1, wherein the abutment surface of each cavity is formed as a pair of abutment surface portions which extend along respective circumferentially-spaced edges of the respective retainer plate.

4. A fan assembly according to claim 1, wherein each first retainer plate has a circumferentially extending groove for location therein of a support ring, wherein the circumferential row of first retainer plates is supported by a respective support ring which locates in the circumferentially extending grooves of the first retainer plates of the row.

5. A fan assembly according to claim 2, wherein each second retainer plate has a circumferentially extending groove for location therein of a support ring, wherein the circumferential row of second retainer plates is supported by a respective support ring which locates in the circumferentially extending grooves of the second retainer plates of the row.

6. A fan assembly according to claim 1, wherein each fan blade is radially outwardly chocked in its slot by a respective slider inserted into the slot radially inwardly of the dovetail root.

7. A fan assembly according to claim 6, wherein the slider carries a spring element which urges the fan blade radially outwardly.

8. A fan assembly according to claim 1, wherein at least the dovetail roots of the fan blades are formed of polymer matrix, fibre reinforced, composite material.

9. A gas turbine engine having the fan assembly of claim 1.

10. A fan assembly according to claim 1, wherein in each first retainer plate the first layer forms a barrier to galvanic corrosion between the dovetail root and the intermediate and second layers of the first retainer plate.

11. A fan assembly according to claim 1, wherein in each first retainer plate the second layer is curved to give the second side a concave outer face.

12. A fan assembly according to claim 1, wherein in each first retainer plate the layered structure further includes a crush layer which is permanently crushable at a lower compressive stress than that of the second layer.

13. A fan assembly according to claim 1, wherein in each first retainer plate the layered structure further includes an additional layer between the intermediate and the second layers, the Young's moduli of the first and intermediate layers also being less than the Young's Modulus of the additional layer.

14. A fan assembly according to claim 13, wherein in each first retainer plate the additional layer is spaced from the second layer.

* * * * *